(No Model.)
J. R. LOWE.
GATE.
No. 294,481. Patented Mar. 4, 1884.
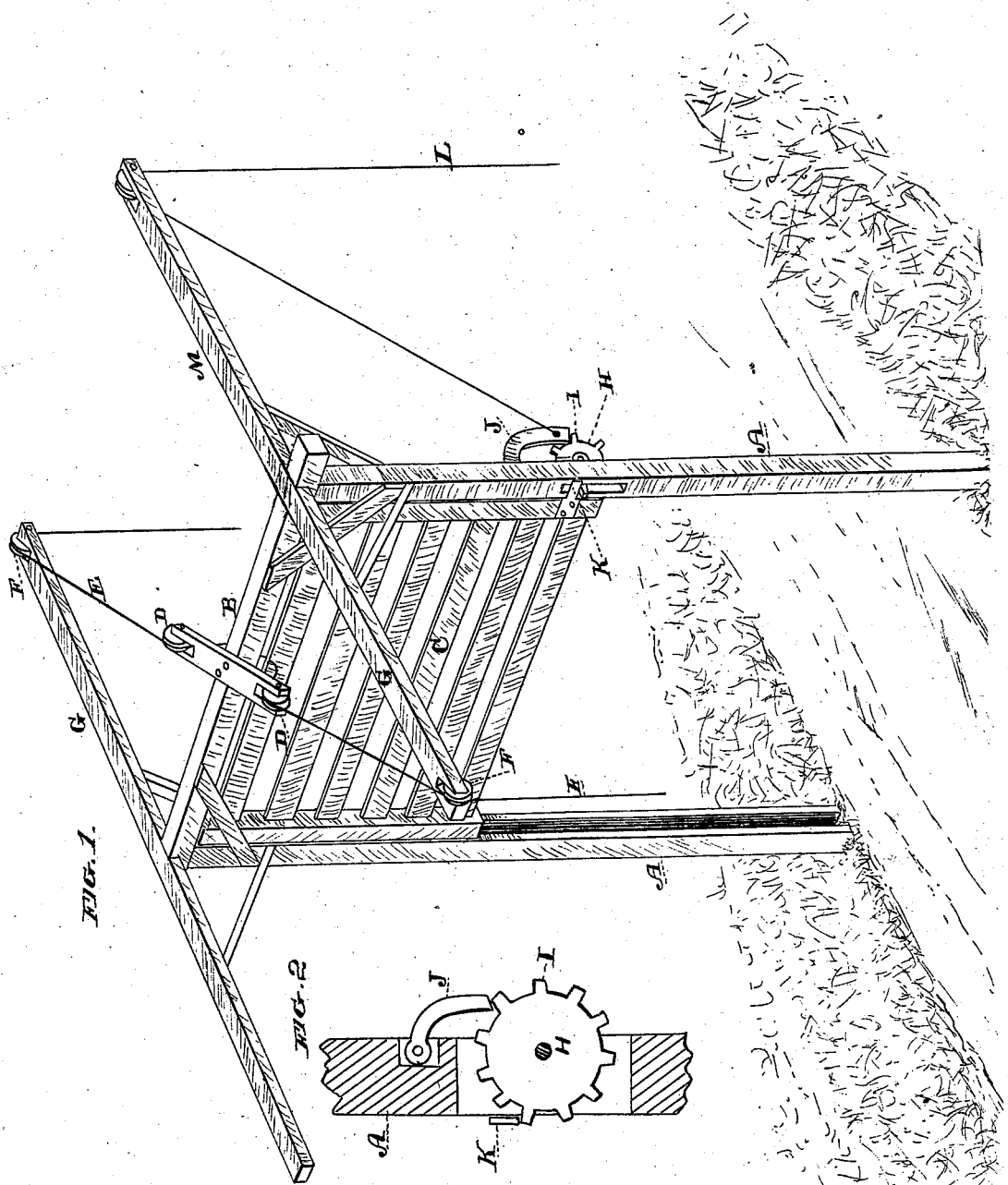

United States Patent Office.

JOHN R. LOWE, OF ANDERSON, CALIFORNIA.

GATE.

SPECIFICATION forming part of Letters Patent No. 294,481, dated March 4, 1884.

Application filed August 4, 1883. (No model.)

*To all whom it may concern:*

Be it known that I, JOHN R. LOWE, of Anderson, county of Shasta, and State of California, have invented an Improvement in Gates; and I hereby declare the following to be a full, clear, and exact description thereof.

My invention relates to certain improvements in field-gates and means for holding them open while being passed; and it consists of the combination of devices hereinafter explained and claimed.

Referring to the accompanying drawings for a more complete explanation of my invention, Figure 1 is a view of my gate, showing the means for keeping it open. Fig. 2 is a detail of construction.

A A are two posts, firmly fixed in the ground, and having a uniting cross-beam, B, at the top. These posts are grooved or channeled longitudinally upon their inner faces, and are of sufficient height to allow the gate to slide up between them and leave space enough below it to pass through.

The gate C has its side posts tongued to fit the channels in the posts A, and is guided thereby.

Upon the center of the cross-bar B are fixed pulleys D, over which cords E pass, one end of each being fastened to the center of the gate, while the other end is carried diagonally over a pulley, F, supported upon an arm, G, which projects from the top of the posts A at right angles, as shown, the cord hanging down, so as to be within the reach of the driver of a vehicle or other person desiring to pass, and by pulling it the gate is raised to the desired height.

In one of the side posts, A, a wheel, H, having teeth I, is journaled to turn loosely, and upon one side of the post a pawl, J, is suspended, so that its free end will engage the teeth of the wheel, and while it allows the wheel to turn, so as to let the gate be opened, the pawl will prevent its turning back until released.

Upon the side of the gate opposite to the pawl is fixed an arm, K, which projects alongside the post A, and, as the teeth of the wheel H project through the post, it will be seen that when the gate is raised the arm K will engage the teeth and turn the wheel until the arm has passed above the teeth. When the gate is allowed to settle down, this arm will rest upon the top of a tooth of the wheel, and the pawl J upon the opposite side prevents the backward rotation of the wheel, which thus holds the gate up as long as desired. After passing, the traveler, by pulling a cord, L, leading over an arm, M, and attached to the pawl J, lifts the latter and releases the gate, which then closes by gravitation.

It will be evident that although I have here only shown means of releasing and closing the gate from one side, still I may, by arranging a cord similar to the cord L over suitable pulleys, release the gate from the opposite side, and vice versa.

This device is certain in operation, simple, and not liable to derangement, and springs may be dispensed with.

I am aware of the patent to S. G. Wood, September 19, 1871, No. 119,101, and to E. L. Rugg, April 15, 1879, No. 214,319, and do not desire, broadly, to claim any of the features therein shown.

Having thus described my invention, what I claim as new, and desire to secure by Letters Patent, is—

1. A vertically-sliding gate moving between guide-posts, and having an arm, K, projecting alongside one of the posts, in combination with a toothed wheel journaled to the post, so that the arm may engage the projecting teeth, and a pawl which engages the teeth upon the opposite side and prevents the wheel's turning back, substantially as herein described.

2. A vertically-sliding gate moving between guide-posts, and having an arm which engages the teeth of a spur-wheel journaled upon one of the posts, and a swinging pawl upon the opposite side of the post by which the wheel is prevented from returning, in combination with the cords E, attached to the gate, and the cords L, attached to the pawl, substantially as herein described.

In witness whereof I have hereunto set my hand.

J. R. LOWE.

Witnesses:
S. H. NOURSE,
H. C. LEE.